United States Patent Office 2,790,716
Patented Apr. 30, 1957

2,790,716
WORM BEDDING AND FOOD COMPOSITION

Donald R. Buss, Lanark, Ill.

No Drawing. Division of application Serial No. 151,865, March 25, 1950. Continuation of application Serial No. 238,013, July 21, 1951. This application August 4, 1955, Serial No. 526,572

9 Claims. (Cl. 99—3)

This application is a continuation of my application, Serial No. 238,013, filed July 21, 1951, and is a division of my copending application, Serial No. 151,865, filed March 25, 1950.

This invention relates to a new and improved worm bedding and food composition enabling keeping alive and in good health and multiplying, earth worms and the like used for fishing bait and soil building.

The object of this invention is to provide a water absorbent bedding which allows air and oxygen to pass freely through it, so that it is ideal as a habitat for earth, blood, and sand worms, the same furthermore containing the necessary food and grit not only to sustain their life for much longer periods than has heretofore been considered possible, outside their natural habitat, but keep them in such good and vigorous physical condition as to make them better adapted for use as fishing bait, or for breeding and transplanting for soil building.

A feature of the present bedding is its water absorbance, which, when the bedding is used properly in a water trapping container, insures that the water content is always just enough higher than the water content of the worms, to maintain the worms in a good, healthy condition.

Another feature of the present worm bedding is that it will not heat, mold, or give off offensive odors.

Still another feature of the present worm bedding is its high water retaining ability which accounts for its keeping the bodies of the worms wet without smothering them as ordinary wet soil would, fresh water being required for earth worms, and ocean or salt water for blood and sand worms.

A further feature of this bedding material is its thermal insulating and retaining properties, which are beneficial when worms have to be shipped long distances during hot weather, because it is found that if the bedding is once cooled to the desired temperature it will keep that temperature for a long time, thus enabling shipment of worms in the hottest weather.

The bedding of my invention, as described in the parent application, is adapted to be put in open-mouth bags with a predetermined number of worms per bag. The bedding is wetted well before being placed in these containers, fresh water or salt water being used, depending upon the kind of worms being packaged for shipment. The bags are perforated, as described in the parent application, so as to drain off surplus water and leave about 10% of the volume of bedding at the bottom of each bag with its initial moisture content, as a reserve supply, in case it should be needed later by reason of no rewetting of the bedding when that becomes necessary. There are other perforations in each bag above the level of the bottom reservoir through which slow seepage occurs, and the evaporation of this moisture on the outside of the bag is highly beneficial in its cooling effect on the bedding in hot weather.

The bedding consists of the following:

|   | Pounds |
|---|---|
| 1. Cellulose, such as wood pulp paper ($\frac{1}{16}''$ or $\frac{1}{8}''$ screen fineness) | 45 |
| 2. Alluvium ($\frac{1}{32}''$ screen fineness) | 55 |
| 3. Cellulose sponge ($\frac{1}{2}''$ screen fineness) | 2 |
| 4. Cereal, such as oatmeal (coarse ground) | 10 |

Items 1 and 2 may be used together, with or without item 3, for a bedding capable of sustaining worm life for an appreciable time, as a worm will find sufficient food value in the bedding of 1 and 2, or 1, 2 and 3, the bedding is truly complete and will sustain worm life a long time. The cellulose (or vegetable fibre) is preferably wood pulp paper, ground in a hammer mill to the desired fineness, $\frac{1}{16}''$ or $\frac{1}{8}''$ screen fineness, or coarser, and is of a fluffy nature, does not mat, and is eaten by the worms. The alluvium, which is a form of solid mineral, when finely divided furnishes the food and grit necessary for all worms' digestive tracts. The chopped up cellulose sponge absorbs twenty times its weight in water and is therefore employed to hold moisture. However, all of the components have a fairly high water retaining ability, so that the worms are assured of keeping wet enough and yet not be in danger of smothering. The ground cereal, such as oatmeal, is consumed by the worms as food. Bedding as herein disclosed has good thermal insulating properties so that worms may be shipped and moved safely long distances even during very hot weather, especially if the bedding is first cooled to the desired temperature, the bedding absorbing outside heat very slowly.

The bedding is sold to worm breeders and shippers, and, when put up in bags as described above, is used by individual fishermen to keep worms from year to year, or at least from one wet period to the next.

It is believed the foregoing description conveys a good understanding of the objects and advantages of my invention. The appended claims have been drawn to cover all legitimate modifications and adaptations.

I claim:

1. A combined bedding and food adapted to serve as a habitat for worms, which consists of a mixture of finely divided cellulose and more finely divided alluvium adapted to have water added thereto and which when added will be largely absorbed by said cellulose.

2. A combined bedding and food for worms as defined in claim 1 and which further includes finely chopped sponge.

3. A combined bedding and food for worms as defined in claim 1 and which further includes a coarsely ground cereal.

4. A combined bedding and food for worms as defined in claim 1 wherein said cellulose has a fineness from about $\frac{1}{16}''$ to $\frac{1}{8}''$ mesh and said alluvium has a fineness of about $\frac{1}{32}''$ mesh.

5. A combined bedding and food for worms as defined in claim 4 wherein said cellulose and alluvium are about equal in amount by weight.

6. A combined bedding and food adapted to serve as a habitat for worms, which consists of a mixture of finely divided cellulose, more finely divided alluvium, and salt water which is largely absorbed by said cellulose.

7. A combined bedding and food for worms which consists of a mixture of finely divided wood pulp paper and more finely divided alluvium adapted to have water added thereto, the water when added being largely absorbed by said wood pulp paper.

8. A combined bedding and food composition adapted to serve as a habitat for worms, which consists of finely divided cellulose and food and grit material that is more finely divided, the said combination adapted to have water added thereto which when added is largely absorbed by the cellulose.

9. A combined bedding and food composition adapted to serve as a habitat for worms, which consists of finely divided wood pulp paper and food and grit material that is more finely divided, the said composition adapted to have water added thereto which when added is largely absorbed by the wood pulp paper.

References Cited in the file of this patent

UNITED STATES PATENTS

| | | |
|---|---|---|
| 2,376,672 | Dreyling | May 22, 1945 |
| 2,472,663 | Kleine et al. | June 7, 1949 |
| 2,580,352 | Grassie | Dec. 25, 1951 |